(12) United States Patent
Kawato et al.

(10) Patent No.: US 11,808,842 B2
(45) Date of Patent: Nov. 7, 2023

(54) DATA GENERATION DEVICE, IMAGE IDENTIFICATION DEVICE, DATA GENERATION METHOD, AND RECORDING MEDIUM

(71) Applicant: MITSUBISHI HEAVY INDUSTRIES, LTD., Tokyo (JP)

(72) Inventors: Hiroshi Kawato, Tokyo (JP); Yuto Kurishita, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 469 days.

(21) Appl. No.: 17/252,522

(22) PCT Filed: Feb. 18, 2019

(86) PCT No.: PCT/JP2019/005793
§ 371 (c)(1),
(2) Date: Dec. 15, 2020

(87) PCT Pub. No.: WO2020/003586
PCT Pub. Date: Jan. 2, 2020

(65) Prior Publication Data
US 2021/0263143 A1      Aug. 26, 2021

(30) Foreign Application Priority Data

Jun. 29, 2018   (JP) .................... 2018-123944

(51) Int. Cl.
*G01S 13/90*     (2006.01)
*G01S 7/41*      (2006.01)
*G06N 3/08*      (2023.01)

(52) U.S. Cl.
CPC .......... *G01S 13/9027* (2019.05); *G01S 7/412* (2013.01); *G01S 7/417* (2013.01); *G01S 13/9064* (2019.05); *G06N 3/08* (2013.01)

(58) Field of Classification Search
None
See application file for complete search history.

(56) References Cited

U.S. PATENT DOCUMENTS 5,546,084 A * 8/1996 Hindman ............... G01S 7/411
   342/162
8,063,815 B2 * 11/2011 Valo ..................... G06V 20/647
   342/25 R (Continued)

FOREIGN PATENT DOCUMENTS

| JP | 2003-331289 | 11/2003 |
| JP | 2013-210207 | 10/2013 |
| JP | 2013-231843 | 11/2013 |

OTHER PUBLICATIONS

English translation of the International Preliminary Report on Patentability dated Dec. 29, 2020 in International Patent Application No. PCT/JP2019/005793.

(Continued)

*Primary Examiner* — Timothy A Brainard
*Assistant Examiner* — Helena H Seraydaryan
(74) *Attorney, Agent, or Firm* — Wenderoth, Lind & Ponack, L.L.P.

(57) ABSTRACT

A data generation device is provided with environment setting means (200), model setting means (210), image calculation means (220) and data output means (230). The environment setting means sets a radar parameter that indicates a specification of a radar that is a synthetic aperture radar or an inverse synthetic aperture radar. The model setting means sets a three-dimensional model that indicates a shape of a target object to identify. The image calculation means calculates a simulation image based on the three-dimensional model and the radar parameter. The data output means outputs training data in that the simulation image and a type of the target object are associated to each other. In (Continued)

addition, the data output means outputs difference data that indicate a difference between a radar image and the simulation image. The model setting means changes the three-dimensional model based on model correction data inputted based on the difference data.

15 Claims, 6 Drawing Sheets

(56) References Cited

U.S. PATENT DOCUMENTS

| | | | | |
|---|---|---|---|---|
| 2009/0184865 | A1* | 7/2009 | Valo | G06V 20/647 |
| | | | | 342/25 F |
| 2017/0010618 | A1* | 1/2017 | Shashua | G01C 21/1652 |
| 2017/0350974 | A1* | 12/2017 | Korchev | G01S 7/412 |

OTHER PUBLICATIONS

International Search Report dated Apr. 23, 2019 in International (PCT) Application No. PCT/JPZO 19/005793.

* cited by examiner

F I G. 1
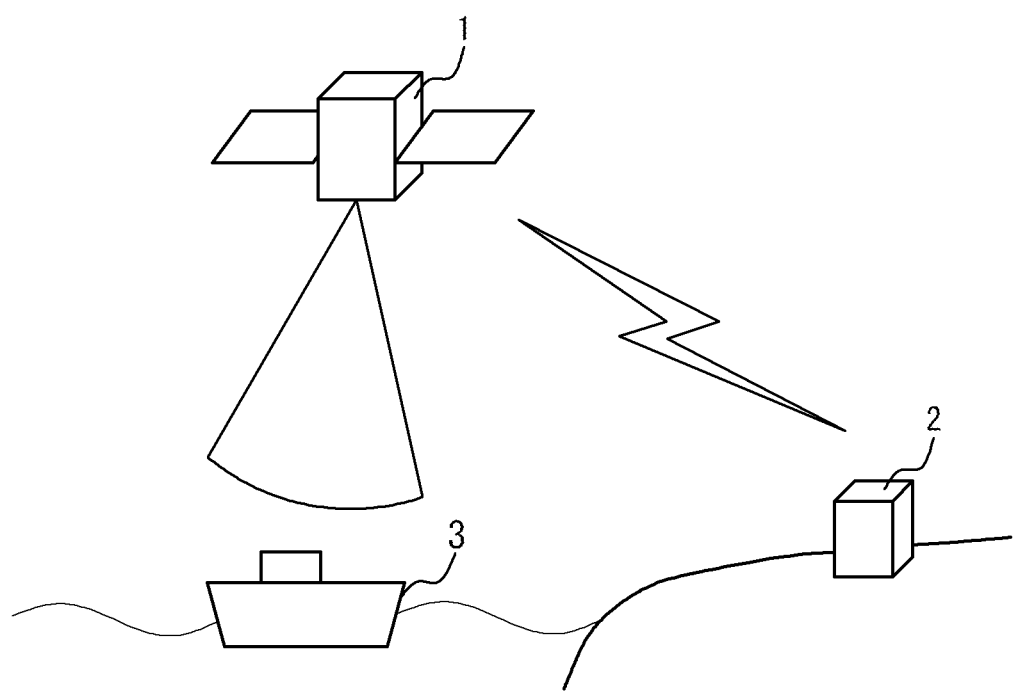

DATA GENERATION DEVICE, IMAGE IDENTIFICATION DEVICE, DATA GENERATION METHOD, AND RECORDING MEDIUM

TECHNICAL FIELD

The present invention relates to a data generation device, an image identification device, a data generation method and a recording medium.

BACKGROUND ART

An image identification device that identifies a target object taken in an image is known. For example, an image identification device collates a sample image of a known target object with an image of an identification target and searches for a best matching sample image. The image identification device identifies that the object taken in the image of the identification target is the target object corresponding to the searched sample image.

Patent literature 1 (Japanese Patent Publication No. 2003-331289 A) discloses a method of image identification by pattern matching for Synthetic Aperture Radar (SAR) images or Inverse Synthetic Aperture Radar (ISAR) images acquired from SAR or ISAR that need numerous sample images. This method aims to improve identification rate and reduction of memory by an identification using data mining and neural network for results of the pattern matching.

Furthermore, the patent literature 1 discloses acquiring the numerous sample images by simulation. Specifically, a three-dimensional model of a target object to identify is prepared in advance. Images acquired by changing imaging direction of this three-dimensional model are used as sample images.

CITATION LIST

Patent Literature

[Patent Literature 1] Japanese Patent Publication No. 2003-331289 A

SUMMARY OF INVENTION

SAR images or ISAR images are used for detection of ships while it is difficult to use them for identification of ships. For this reason, identification of ships or the like that are taken in SAR images or ISAR images is required.

The present invention is made in view of above described circumstances and has an objective of providing training data to improve identification rate of image identification device for SAR images or ISAR images. Other objectives can be understood from following disclosures and description of embodiments.

A data generation device according to an embodiment to achieve the above described objective is provided with an environment setting means, a model setting means, an image calculation means and a data output means. The environment setting means sets a radar parameter that indicates a specification of a radar that is a synthetic aperture radar or an inverse synthetic aperture radar. The model setting means sets a three-dimensional model that indicates a shape of a target object to identify. The image calculation means calculates a simulation image based on the three-dimensional model and the radar parameter. The data output means holds a radar image of the target object acquired by the radar and outputs difference data that indicate a difference between the radar image and the simulation image. In addition, the model setting means changes the three-dimensional model based on model correction data inputted based on the difference data. The environment setting means sets a plurality of radar parameters when determining that the three-dimensional model is decided. The image calculation means calculates a plurality of simulation images respectively corresponding to a plurality of radar parameters. The data output means outputs training data in that the plurality of simulation images and a type of the target object are associated to each other. Those training data are data for an image identification device, that identifies a type of an object taken in an inputted image, to learn.

An image identification device according to an embodiment is provided with a learning means and an identification means. The learning means learns by use of the training data generated by the above described data generation device. The identification means identifies a type of an object taken in an inputted image based on a result of the learning means.

A data generation method according to an embodiment includes following steps executed by a processing device:
  a step of setting a radar parameter that indicates a specification of a radar that is a synthetic aperture radar or an inverse synthetic aperture radar;
  a step of setting a three-dimensional model that indicates a shape of a target object to identify;
  a step of calculating a simulation image based on the three-dimensional model and the radar parameter;
  a step of outputting difference data that indicates a difference between a radar image of the target object acquired by the radar and the simulation image;
  a step of changing the three-dimensional model based on model correction data inputted based on the difference data;
  a step of setting a plurality of radar parameters when the three-dimensional data is determined to be decided;
  a step of calculating a plurality of simulation images respectively corresponding to the plurality of radar parameters; and
  a step of outputting training data in that the plurality of simulation images and a type of the target object are associated to each other.

Herein, the training data are data for an image identification device, that identifies a type of an object taken in an inputted image, to learn.

A recording medium according to an embodiment stores a program to make a processing device execute following steps:
  a step of setting a radar parameter that indicates a specification of a radar that is a synthetic aperture radar or an inverse synthetic aperture radar;
  a step of setting a three-dimensional model that indicates a shape of a target object to identify;
  a step of calculating a simulation image based on the three-dimensional model and the radar parameter;
  a step of outputting difference data that indicates a difference between a radar image of the target object acquired by the radar and the simulation image;
  a step of changing the three-dimensional model based on model correction data inputted based on the difference data;
  a step of setting a plurality of radar parameters when the three-dimensional data is determined to be decided;
  a step of calculating a plurality of simulation images respectively corresponding to the plurality of radar parameters; and a step of outputting training data in that the plurality of simulation images and a type of the target object are associated to each other.

Herein, the training data are data for an image identification device, that identifies a type of an object taken in an inputted image, to learn.

According to the present invention, training data to acquire an image identification device having a high identification rate can be generated.

BRIEF DESCRIPTION OF DRAWINGS

FIG. 1 is a schematic diagram when taking a radar image.

DESCRIPTION OF EMBODIMENTS

It is difficult to understand a detailed shape of a target object in a radar image acquired by a synthetic aperture radar or an inverse synthetic aperture radar. From this, the inventors have found out that deep learning is useful to identify a radar image. Numerous training images are necessary to use deep learning. However, as radar images are expensive, it is difficult to prepare numerous radar images that have been actually taken.

By use of a three-dimensional model and a simulator, numerous simulation images of radar images can be acquired. However, a difference occurs between a simulation image acquired by use of a simulator and an actually taken radar image. The inventors have found out that this difference greatly affects identification rate for radar images in which a shape of a ship is not expressed in detail, and have reached the present invention.

Embodiment

A radar image is acquired by synthesizing images of a target object taken from a plurality of directions. For this reason, as shown in FIG. 1, an artificial satellite 1 takes a radar image by irradiating radar waves to a ship 3 as a target object and receiving reflected waves therefrom while moving. By doing so, the artificial satellite 1 can acquire radar images taken from a plurality of positions and acquires a radar image by synthesizing the plurality of radar images. For this reason, a detailed shape of a moving target object such as a ship 3 swaying in waves is hardly seen in a radar image. A radar image generally indicates an amplitude of a reflected wave as a brightness. Specifically, a part with a high brightness indicates a position with a large amplitude, that is, a position with large energy of the reflected wave in other words.

Figure 2:
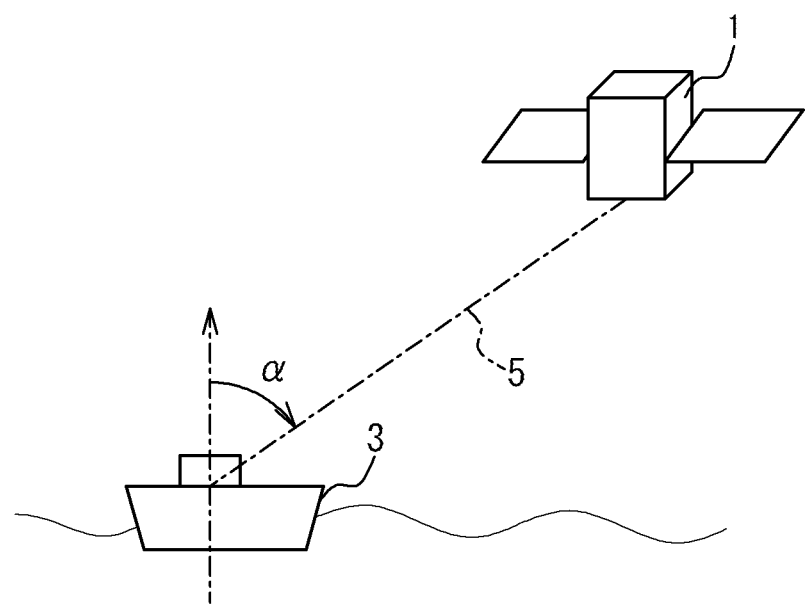
FIG. 2 is a diagram to explain an incident angle when taking a radar image.
Figure 3:
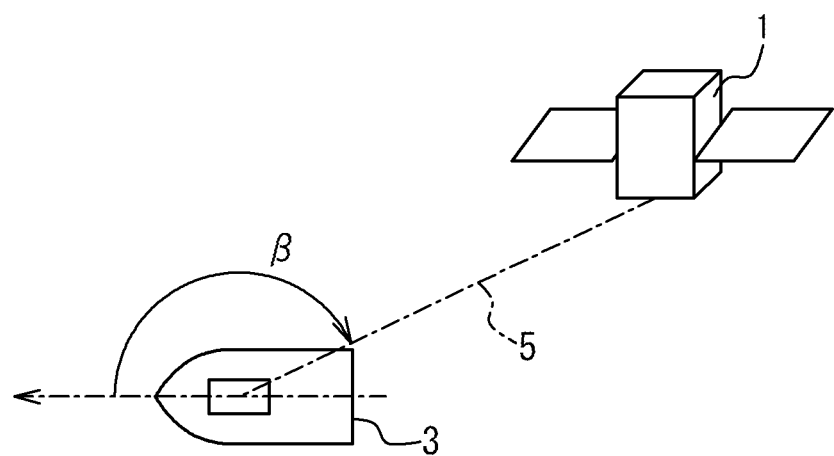
FIG. 3 is a diagram to explain an irradiation direction when taking a radar image.

In addition, a radar image greatly changes in accordance with an angle of the radar wave that the artificial satellite 1 irradiates to the ship 3. The angle of the radar wave that the artificial satellite 1 irradiates to the ship 3 can be defined mainly with an incident angle α and an irradiation direction β. As shown in FIG. 2, the incident angle α indicates an angle formed by a straight line 5 connecting the artificial satellite 1 and the ship 3, that is, a straight line connecting a synthetic aperture radar or an inverse synthetic aperture radar and the ship 3, and a vertical direction at a position of the ship 3. As shown in FIG. 3, the irradiation direction β indicates an angle formed by a straight line 5 connecting the artificial satellite 1 and the ship 3, and a travelling direction of the ship 3, when viewed from a vertical direction of the ship 3. Specifically, the irradiation direction β indicates a clockwise angle from the travelling direction of the ship 3 to the direction of the artificial satellite 1 relative to the ship 3. For this reason, the irradiation direction β has a range from 0 degree to 360 degrees. Specifically, if the artificial satellite 1 is in the right of the ship 3 when facing the travelling direction of the ship 3, the irradiation direction β indicates an angle from 0 degree to 180 degrees. If the artificial satellite 1 is in the left of the ship 3, the irradiation direction β indicates an angle from 180 degrees to 360 degrees. Even if the same ship 3 is taken in image, the radar image differs depending on the incident angle α and the irradiation direction β.

Figure 4:
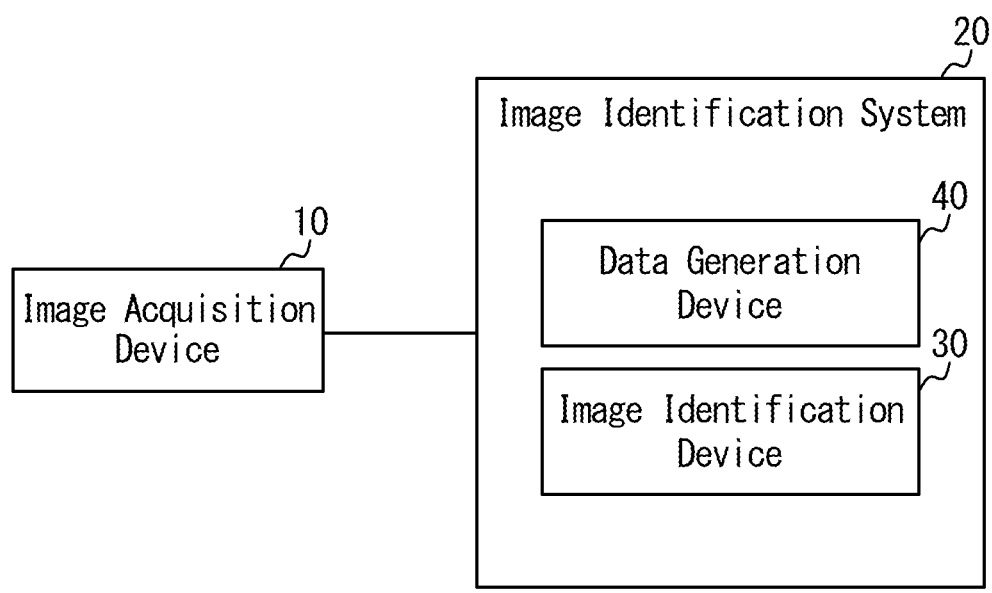
FIG. 4 is a diagram that shows a configuration of an image identification system.

As shown in FIG. 1, in order to identify this radar image, the artificial satellite 1 transmits acquired radar images to a ground facility 2. The ground facility 2 identifies acquired radar images. Specifically, as shown in FIG. 4, the artificial satellite 1 is provided with an image acquisition device 10 that acquires radar images. The ground facility 2 is provided with an image identification system 20 that identifies radar images.

The image acquisition device 10 is provided with a radar, a synthetic aperture radar for example, to acquire radar images. The image acquisition device 10 transmits radar images acquired by the radar to the image identification system 20.

The image identification system 20 is provided with an image identification device 30 and a data generation device 40. The image identification device 30 identifies a type of an object taken in a radar image. The data generation device 40 generates training data to be used in a learning of the image identification device 30. The type of an object includes types, models and the like of moving objects such as a vehicle, a passenger ship, a fishing boat, a warship, a cargo ship and a tanker or the like.

(Image Identification Device)

Figure 5:
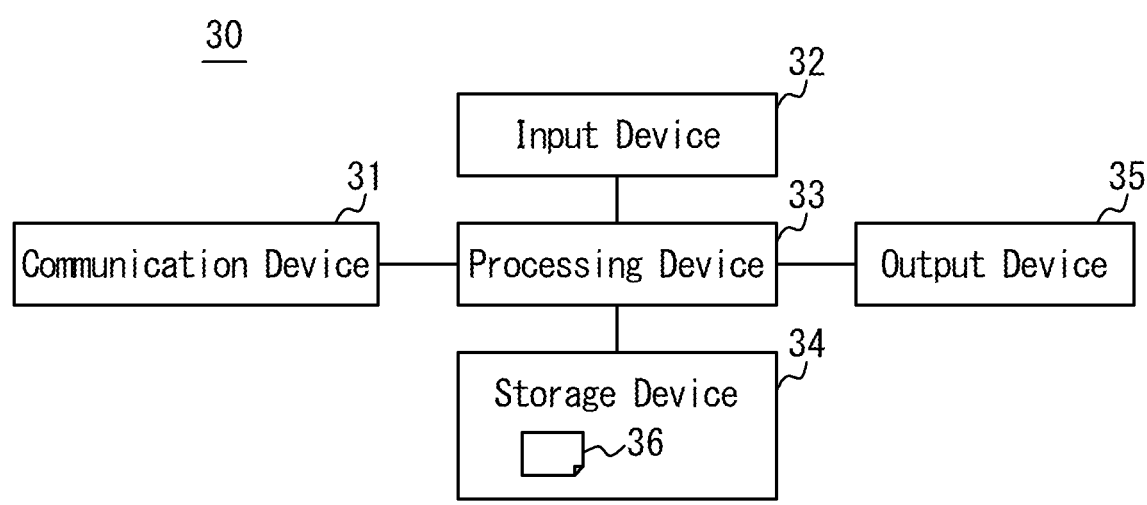
FIG. 5 is a diagram that shows a configuration of an image identification device.

As shown in FIG. 5, the image identification device 30 is provided with a communication device 31, an input device 32, a processing device 33, a storage device 34 and an output device 35. The communication device 31 performs communication with outside and receives radar images and the like transmitted by the artificial satellite 1. The communication device 31 is connected to the processing device 33 and outputs received data to the processing device 33. In addition, the communication device 31 transmits data inputted from the processing device 33 to an external device. The communication device 31 is exemplified by various devices such as a Network Interface Card (NIC) to be connected to a Local Area Network (LAN), Wide Area Network (WAN) or the like, a Universal Serial Bus (USB) to be directly connected to an external device, an antenna or the like to perform wireless communication.

The input device 32 accepts an input of data required for calculation. The input device 32 outputs inputted data to the processing device 33. The input device 32 includes various devices such as a keyboard, a mouse, a microphone or a touch panel.

The processing device 33 reads out an image identification program 36 stored in the storage device 34 and executes the image identification program 36. In addition, the processing device 33 stores data inputted from the communication device 31 and the input device 32 to the storage device 34 as necessary. The processing device 33 includes a Central Processing Unit (CPU) or the like.

The storage device 34 stores the image identification program 36 and data required for the processing device 33 to execute the image identification program 36. The storage device 34 outputs stored data to the processing device 33 based on an instruction from the processing device 33. The storage device 34 includes various devices such as a readable/writable recording medium or a read-only recording medium. A readable/writable recording medium includes a Hard Disk Drive (HDD), a USB memory or the like. A read-only recording medium includes a Compact Disk (CD) or the like.

The output device 35 outputs a result of a process executed by the processing device 33 and the like. For example, the output device 35 includes a display device such as a liquid crystal display and displays a result of a process by the processing device 33. In addition, the output device 35 includes various devices to notify a user, such as a speaker or a warning light.

Figure 6:
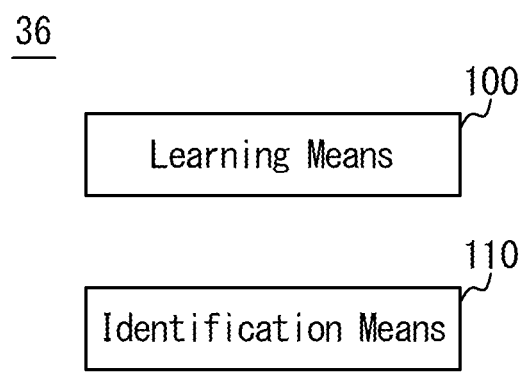
FIG. 6 is a diagram that shows a configuration of an image identification program.

As described above, the image identification device 30 identifies an image by a process executed by the processing device 33 based on the image identification program 36 stored in the storage device 34. Therefore, as shown in FIG. 6, the image identification program 36 includes a learning means 100 and an identification means 110.

The learning means 100 has a function of learning in order to identify radar images by use of deep learning. For example, a structure and parameters of a deep neural network are set as initial values in the image identification program 36. By inputting numerous training data including training images to this deep neural network, the structure and parameters of the deep neural network are updated. The learning means 100 includes a means for setting the initial values of the structure and parameters of the deep neural network and a means for updating them.

The identification means 110 has a function of identifying radar images by use of deep learning. For example, the identification means 110 identifies radar images by use of the deep neutral network learned by the learning means 100. The structure and parameters of the deep neutral network are updated by the learning means 100 so as to be able to identify radar images. Therefore, when radar images are inputted to the learned deep neutral network, the learned deep neutral network can identify objects taken in the radar images and output data indicating types of the identified objects.

As described above, the image identification device 30 learns by use of training data and identifies types of objects taken in radar images.

(Data Generation Device)

Figure 7:
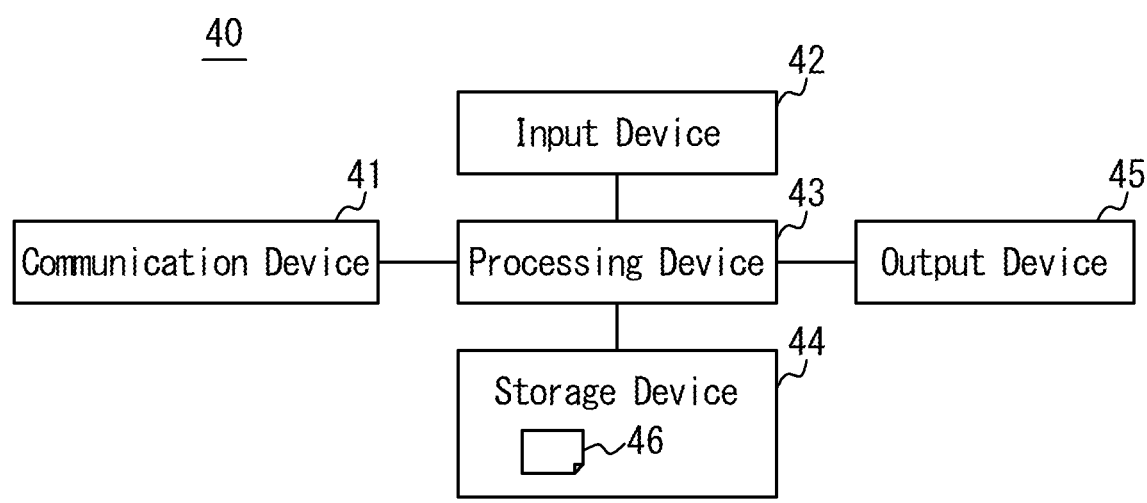
FIG. 7 is a diagram that shows a configuration of a data generation device.

As shown in FIG. 7, the data generation device 40 is provided with a communication device 41, an input device 42, a processing device 43, a storage device 44 and an output device 45. The communication device 41, the input device 42 and the output device 45 function similarly to the communication device 31, the input device 32 and the output device 35 of the image identification device 30, respectively.

The processing device 43 reads out a data generation program 46 stored in the storage device 44 and executes the data generation program 46. In addition, similarly to the processing device 33 of the image identification device 30, the processing device 43 stores data inputted from the communication device 41 and the input device 42 in the storage device 44 as necessary. The processing device 43 includes a CPU.

The storage device 44 stores the data generation program 46 and data required for the processing device 43 to execute the data generation program 46. The storage device 44 outputs stored data to the processing device 43 based on an instruction from the processing device 43. The storage device 44 includes various devices such as readable/writable recording medium and read-only recording medium, similarly to the storage device 34 of the image identification device 30.

Figure 8:
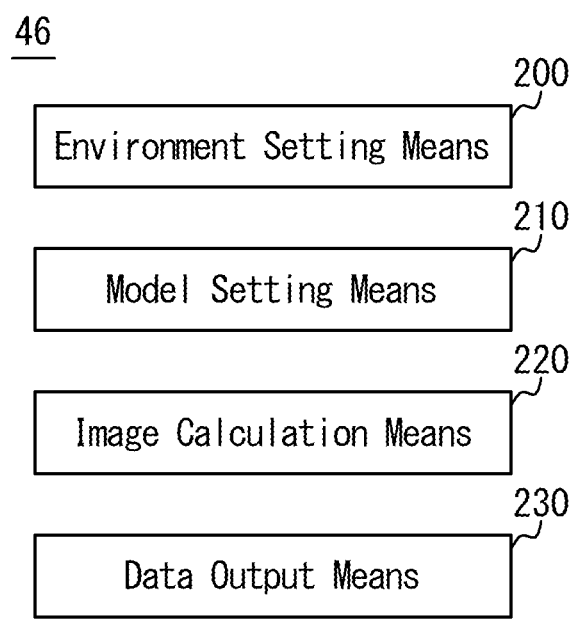
FIG. 8 is a diagram that shows a configuration of a data generation program.

The data generation program 46 generates the training data for the image identification device to learn based on radar images in that a known target object is taken. As shown in FIG. 8, the data generation program 46 is provided with an environment setting means 200, a model setting means 210, an image calculation means 220 and a data output means 230. The model setting means 210 sets model data that indicate a three-dimensional model of the target object taken in the radar images. The image calculation means 220 calculates a simulation image of the three-dimensional model set by the model setting means 210 by use of a simulation of calculating radar images acquired from SAR or ISAR. The environment setting means 200 sets a parameter for the image calculation means 220 to perform the simulation. This parameter includes radar parameters that indicate the incident angle $\alpha$, the irradiation direction $\beta$ and the like of the radar. The data output means 230 outputs training data in that a type of the target object and the calculated simulation images are associated to each other.

Figure 9:
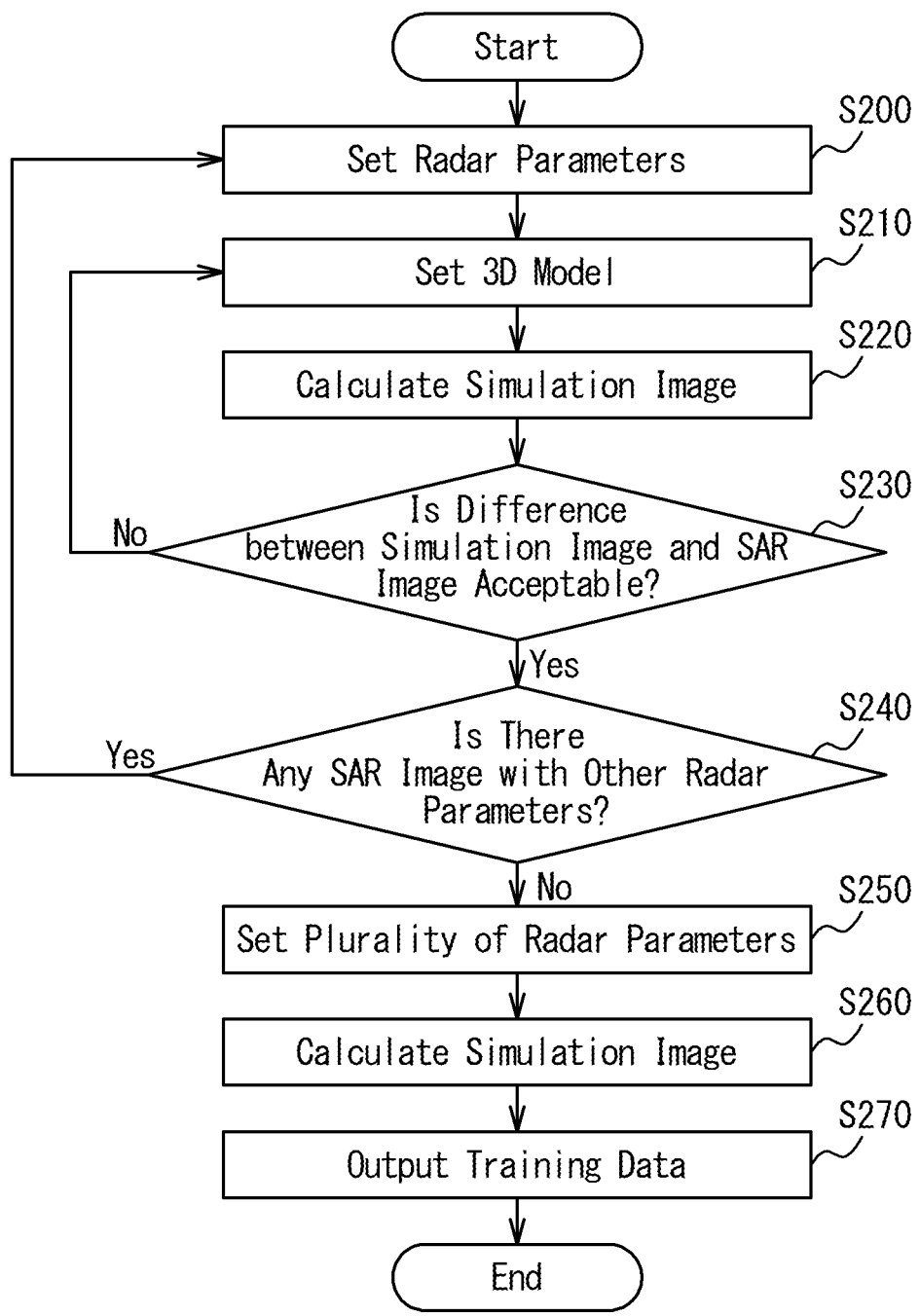
FIG. 9 is a flowchart related to processes of a data generation program.

A method to generate training data including simulation images by use of the data generation device 40 will be shown. When executing the data generation program 46, the data generation device executes a data generation method that is shown in FIG. 9. The environment setting means 200 holds radar parameters at a moment when a radar image of a known target object is taken. In step S200, the environment setting means 200 sets radar parameters of the radar images in that the known target object is taken. The radar parameters may include, in addition to the incident angle $\alpha$ and the irradiation direction data that indicate radar specifications such as a radar band, a polarization direction and an image resolution. In addition, when there is a plurality of radar images, the environment setting means 200 may hold a first radar parameter set and a second radar parameter set. In this case, the first radar parameter set includes a radar parameter that has been already used to calculate a simulation image in processes in and after step S210. The second radar parameter set includes one of more radar parameters corresponding to the radar images. The environment setting means 200 adds the radar parameters that it has set to the first radar parameter set. By doing so, the radar parameter used to calculate the simulation image is included in the first radar parameter set.

In step S210, the model setting means 210 sets model data of a three-dimensional model to input in the simulator. A shape of this three-dimensional model indicates a shape of a known target object taken in a radar image. In addition, a reflectance according to an assumed material is set in each part of the three-dimensional model. For example, a higher reflectance is set to a metallic part and a lower reflectance is set to a part such as wood. The model setting means 210 provides an application to generate a three-dimensional model and sets the three-dimensional model based on data inputted to the input device 42 by a user. In addition, the model setting means 210 may select a three-dimensional model that is prepared in advance. In addition, the model setting means 210 may generate a three-dimensional model based on a photography (such as an optical photography), a drawing or the like of a target object.

In step S220, the image calculation means 220 calculates a simulation image that is acquired by irradiating a radar wave, such as one of a SAR, to the three-dimensional model that has been set. The image calculation means 220 executes a simulation based on the three-dimensional model and the radar parameters. A simulation image is calculated as an execution result of the simulation.

The data output means 230 holds radar images in that a known target object is taken. In step S230, the data output means 230 outputs the simulation image calculated by the image calculation means 220 and the radar images in that the target object is taken to the output device 45. A simulation image and a radar image are displayed side by side for an easy comparison. A user compares the simulation image and the radar image. When the simulation image is different from the radar image, the user inputs model correction data to correct a size, an aspect ratio, a detailed shape, reflectance of each part and the like of the three-dimensional model, and the process moves to step S210. In step S210, the model setting means 210 corrects the three-dimensional model based on the model correction data. For example, brightness of the radar image and brightness of the simulation image in a same position are compared. When the brightness of the radar image is higher than the brightness of the simulation image, the model correction data are inputted so that the model setting means 210 raises the reflectance of the three-dimensional model corresponding to the position. When the brightness of the radar image is lower than the brightness of the simulation image, the model correction data are inputted so that the model setting means 210 makes the reflectance of the three-dimensional model corresponding to the position, low. In addition, when a difference between the brightness of the radar image and the brightness of the simulation image is acceptable, the model correction data are inputted assuming that there is no difference between the simulation image and the radar image. The model setting means 210 can set reflectance corresponding to detailed parts such as a metal wire, a metal member and the like of the ship 3, by adjusting the three-dimensional model based on such model correction data. For example, the metal wire includes a communication antenna, a fall prevention metal fence and the like of the ship 3. The metal member includes a metal reinforcing material, a connecting material and the like for a wooden ship. When there is no difference between the simulation image and the radar image or when the difference is acceptable, the process moves to step S240.

In step S240, the environment setting means 200 determines whether there is a radar image with another radar parameter. radar image with another radar parameter, the process returns to step S200 to change the radar parameter. Steps 210 to 230 are executed based on the radar parameter that have been changed and the radar image corresponding thereto to correct the three-dimensional model. When there is no radar image with other radar parameter, the environment setting means 200 determines that the three-dimensional model is decided and the process moves to step S250. Specifically, the environment setting means 200 verifies whether all of the radar parameters included in the second radar parameter set are included in the first radar parameter set. The first radar parameter set includes a radar parameter that has been set once in a calculation of the simulation image. On the other hand, the second radar parameter set includes a radar parameter corresponding to existing radar images. For this reason, when a radar parameter that is not included in the first radar parameter set is included in the second radar parameter set, the process returns to step S200 and the radar parameter that is not included in the first radar parameter set is set. As a result, the three-dimensional model is corrected by use of a radar parameter that is not yet used for a calculation of a simulation image. When there is no radar parameter that is not included in the first radar parameter set in the second radar parameter set, the process moves to step S250. By doing so, the three-dimensional model can be set for all radar parameters corresponding to existing radar images. It should be noted that this process may be omitted if the three-dimensional model does not need to be corrected for a plurality of radar parameters.

The difference between a radar image that is actually taken and a simulation image becomes smaller by this step S240. A radar image from one direction includes a shadow portion that is not taken in image. In addition, when radar bands are different, reflectance changes in accordance with materials. For this reason, by setting the three-dimensional model by use of radar images with a plurality of radar parameters, a more detailed structure of the target object can be set to the three-dimensional model. Therefore, simulation images are generated by use of a three-dimensional model to which more detailed structure is set. As a result, the image identification device 30 that has learned by use of those simulation images has a high identification rate.

In step S250, the environment setting means 200 sets a plurality of radar parameters of a radar wave irradiated to the three-dimensional model. For example, the plurality of radar parameters is set by combining a value of each band that have been used when setting the three-dimensional model, a value of an arbitrary incident angle α and a value of an arbitrary irradiation direction β.

In step S260, the image calculation means 220 calculates a plurality of simulation images corresponding to the plurality of radar parameters set by the environment setting means 200, respectively. That is, the image calculation means 220 calculates one simulation image for one radar parameter.

In step S270, the data output means 230 outputs training data including the simulation images calculated by the image calculation means 220 and data indicating a type of the target object. The simulation images and data indicating a type of the target object are associated to each other in the training data.

The image identification device 30 performs deep learning by use of training data outputted by the data output means 230. A difference between the training data outputted by the data output means 230 and the radar images of the target object is small. For this reason, the image identification device 30 can acquire a high identification rate by performing deep learning using those training data.

In addition, the training data may include a radar parameter such as a value of the incident angle α or a value of the radar band. In this case, the simulation image, the radar parameter used to calculate the simulation image and the data indicating a type of the target object are associated to each other. The radar parameter such as the value of the radar band is decided in accordance with the radar image that is taken because it is a specification of the radar image.

For this reason, the radar parameter may be inputted to the image identification device 30 when the identification means 110 identifies the radar image. That is, the image identification device 30 can identify the radar image by use of radar parameter as well, by the input of the radar parameter to the image identification device 30. Therefore, the image identification device 30 can improve the identification rate.

The image calculation means 220 may calculate a simulation image in accordance with change of state such as sway, speed or the like of the ship 3. For example, when the speed of the ship 3 is high, the ship 3 is taken in a radar image with a shape extended in a travelling direction. For this reason, the image calculation means 220 may calculate a simulation image by calculating and synthesizing radar images of the ship 3 of which a position is changed in accordance with the speed of the artificial satellite 1 and the speed of the ship 3.

In addition, when the ship 3 is docked, the outline of the ship 3 becomes unclear due to a gulf facility to which the ship 3 is adjacent. For this reason, the image calculation means 220 may calculate a simulation image by including data indicating a surrounding three-dimensional model of the port facility and not of only the ship 3. Furthermore, as a radar image becomes unclear due to sway of the ship 3 when waves are high, the image calculation means 220 may calculate a simulation image by setting sway of the ship 3. In addition, the image calculation means 220 may calculate a simulation image by setting a position of a water line of the ship 3.

In addition, the image calculation means 220 may correct, after calculating a simulation image by a simulation, the simulation image based on sway, speed or the like of the ship 3. For example, when the ship 3 is swaying due to high waves or when the ship 3 is docked, the image calculation means 220 may add a noise to the outline of the ship 3 in the simulation image. In addition, when the speed of the ship 3 is high, the image calculation means 220 may correct the simulation image so that the ship 3 is extended in the travelling direction.

The model setting means 210 may set the speed of the target object in step S210 when the target object taken in the radar image is moving. In this case, in step S220, the image calculation means 220 performs a simulation that reflects the speed that is set and calculates the simulation image. By doing so, even if the target object taken in the radar image is moving, the simulation image and the radar image can be easily compared. In other words, the model setting means 210 can set the three-dimensional model more specifically. As a result, the identification rate of the image identification device 30 can be improved.

In addition, in step S210, when the target object taken in the radar image is anchored at the gulf facility, the model setting means 210 may set data indicating the surrounding three-dimensional model of the gulf facility. In this case, in step S220, the image calculation means 220 calculates the simulation image by arranging the three-dimensional model of the gulf facility that has been set and the three-dimensional model of the target object. The three-dimensional model can be set more specifically by comparing the calculated simulation image and the radar image and correcting the three-dimensional model.

In addition, in step S210, the model setting means 210 may set wave height, water line position and the like. In this case, in step S220, the image calculation means 220 arranges the three-dimensional model of the target object so that the water line is as set, adds sway to the target object in accordance with the wave height and calculates the simulation image. Furthermore, the image calculation means 220 may add a change of sea surface due to wave height, wave period and the like and calculate the simulation image.

As described above, the model setting means 210 sets states of the target object and the surrounding thereof so that comparison between the calculated simulation image and the radar images can be facilitated. Therefore, the three-dimensional model of the target object can be set specifically. As the simulation image included in the training data can be calculated by use of the three-dimensional model that has been specifically set, the image identification device that has learned by use of those training data has a high identification ability.

In addition, the data generation device 40 may calculate simulation images in which the speed of the target object, surrounding facilities such as gulf facilities, wave height, water line and the like are changed to include in the training data. By doing so, as training data in accordance with various states of the target object can be acquired, the image identification device 30 that has learned by use of those training data has a high identification ability. Furthermore, the data generation device 40 may calculate simulation images in which the distance between the artificial satellite 1 and the target object is changed to include in the training data. In addition, environment parameters including data acquirable as states when a radar image has been taken, such as wave height, wave period or distance between artificial satellite 1 and target object, may be included in the training data. In this case, the environment parameters, a simulation image and data indicating a type of the target object are associated to each other.

(Variations)

Although an example in that an artificial satellite 1 takes radar images has been shown in the above embodiments, this is not limitative. As long as a radar image can be taken, an arbitrary method therefor can be selected. For example, a flying object such as an aircraft or a ground facility may take a radar image.

In addition, although the ship 3 has been shown as an example of a target object in the above description, any object may be arbitrarily selected as long as it can be taken in a radar image. For example, the target object is exemplified by a vehicle, an aircraft, a ground facility or the like.

Although in the above embodiments an example in which a data output means 230 outputs a radar image and a simulation image as a difference data has been shown, it is not limitative. As long as a user can verify a difference between a radar image and a simulation image, an arbitrary method therefor may be selected. For example, the data output means 230 may compare a radar image and a simulation image and output an image in that a difference region is highlighted. In addition, the data output means 230 may output an image that shows a brightness difference between a radar image and a simulation image as brightness.

Although in the above embodiments an example in which the user inputs in step S230 model correction data based on the difference data has been shown, it is not limitative. The data output means 230 may output model correction data based on difference data. Specifically, the data output means 230 calculates a difference of brightness between a position in a radar image and a position of a simulation image corresponding thereto. Next, the data output means 230 searches for a position where the calculated difference of brightness is larger than a predetermined threshold value. The data output means 230 outputs model correction data to correct reflectance of the three-dimensional model corresponding to the searched position. As described above, the data output means 230 may search for a position where brightness of the radar image and brightness of the simulation image are different as a correction position and output model correction data to correct the setting of the three-dimensional model corresponding to the correction position.

The process described above is an example and order and content of process in each step may be changed as long as the function is not inhibited. In addition, the described configuration may be arbitrary changed as long as the function is not inhibited. For example, the artificial satellite 1 may transmit data of images taken in each position to the ground facility 2 and the radar image synthesized of each image may be calculated in the ground facility 2. In addition, one device may have a function of the image identification device 30 and a function of the data generation device 40. The function of the image identification device and the function of the data generation device may be executed by a plurality of devices. The data generation device 40 may not be provided with the input device 42 and the output device 45. In this case, the communication device 41 communicates with an external device provided with an input device 42 and an output device 45 and performs reception of input data and transmission of output data. Similarly, the image identification device 30 may not be provided with the input device 32 and the output device 35. In addition, the image identification device 30 is not limited to deep learning and may select various identification methods. In addition, the image identification device 30 may identify, as well as a type of an object, a part or all of the environment parameters such as data indicating speed of a target object. By identifying environment parameters such as data indicating speed, the image identification device can exclude a result in that speed or the like is obviously wrong with respect to a type of the target object.

It is obvious that the present invention is not limited by each of the above described embodiments and each embodiment may be appropriately deformed or modified within a scope of technical idea of the present invention. Technologies of each embodiment can be used in other embodiments unless a technical contradiction occurs.

The present invention claims priority based on Japanese Patent Application No. 2018-123944 filed on Jun. 29, 2018 and herein incorporates the whole disclosure thereof.

The invention claimed is:

1. A data generation device comprising:
an environment setting means configured to set a first radar parameter that indicates a specification of a radar that is a synthetic aperture radar or an inverse synthetic aperture radar;
a model setting means configured to set a three-dimensional model that indicates a shape and a reflectance of a target object to identify;
an image calculation means configured to calculate a simulation image based on the three-dimensional model and the first radar parameter; and
a data output means configured to hold a radar image of the target object acquired by the radar and output difference data that indicate a difference between a brightness of the radar image and a brightness of the simulation image,
wherein the model setting means is further configured to change the three-dimensional model by use of model correction data that indicates a reflectance inputted based on the difference data,
wherein the environment setting means is further configured to set a plurality of radar parameters when determining that the three-dimensional model is decided,
wherein the image calculation means is further configured to calculate a plurality of simulation images respectively corresponding to the plurality of radar parameters,
wherein the data output means is further configured to output training data in that the plurality of simulation images and types of the target object are associated to each other, and
wherein the training data are data for an image identification device, configured to identify a type of an object taken in an inputted image, to learn.

2. The data generation device according to claim 1, wherein the image calculation means is further configured to calculate the simulation image by use of an environment parameter that indicates a state when the target object is taken in image.

3. The data generation device according to claim 2, wherein the environment parameter includes a surrounding three-dimensional model that indicates a facility around the target object.

4. The data generation device according to claim 2,
wherein the target object is a ship, and
wherein the environment parameter includes a wave height.

5. The data generation device according to claim 2, wherein the training data:
includes the environment parameter; and
associates the plurality of simulation images and the environment parameter to each other.

6. The data generation device according to claim 1, wherein the image calculation means is further configured to calculate the simulation image by use of speed of the target object.

7. The data generation device according to claim 1, wherein the training data:
includes a plurality of radar parameters; and
associates the plurality of radar parameters and the plurality of simulation images to each other.

8. The data generation device according to claim 1,
wherein the first radar parameter includes:
an incident angle that indicates an angle formed by a vertical direction of the target object and a straight line that connects the radar and the target object; and
an irradiation direction that indicates an angle formed by a travelling direction of the target object and a direction from the radar to the target object.

9. The data generation device according to claim 1, wherein the first radar parameter and the plurality of radar parameters include a band of the radar.

10. The data generation device according to claim 1,
wherein the environment setting means is further configured to:
hold a second radar parameter at a moment when the radar image is taken;
set, when holding the second radar parameter different from the first radar parameter used to calculated the simulation image, the second radar parameter, that is different from the first radar parameter, to be used to calculate the simulation image; and
determine, when not holding the second radar parameter different from the first radar parameter used to set the three-dimensional model, that the three-dimensional model is decided.

11. The data generation device according to claim 1, wherein the data output means is further configured to:

search for a correction position where the radar image and the simulation image are different from each other, based on the difference data; and output the model correction data to correct a setting of the three-dimensional model corresponding to the correction position.

12. An image identification device comprising:
a learning means configured to learn by use of the training data generated by the data generation device according to claim 1; and
an identification means configured to identify a type of an object taken in an inputted image, based on a result of the learning means.

13. The image identification device according to claim 12, configured to use deep learning.

14. A data generation method that a processing device executes, the method including:
a step of setting a radar parameter that indicates a specification of a radar that is a synthetic aperture radar or an inverse synthetic aperture radar;
a step of setting a three-dimensional model that indicates a shape and a reflectance of a target object to identify;
a step of calculating a simulation image based on the three-dimensional model and the radar parameter;
a step of outputting a difference data that indicates a difference between a brightness of a radar image of the target object acquired by the radar and a brightness of the simulation image;
a step of changing the three-dimensional model based on model correction data that indicates a reflectance inputted based on the difference data;
a step of setting a plurality of radar parameters when the three-dimensional model is determined to be decided;
a step of calculating a plurality of simulation images respectively corresponding to the plurality of radar parameters; and
a step of outputting training data in that the plurality of simulation images and types of the target object are associated to each other,
wherein the training data are data for an image identification device, configured to identify a type of an object taken in an inputted image, to learn.

15. A recording medium that stores a program to make a processing device execute:
a step of setting a radar parameter that indicates a specification of a radar that is a synthetic aperture radar or an inverse synthetic aperture radar;
a step of setting a three-dimensional model that indicates a shape and a reflectance of a target object to identify;
a step of calculating a simulation image based on the three-dimensional model and the radar parameter;
a step of outputting a difference data that indicates a difference between a brightness of a radar image of the target object acquired by the radar and a brightness of the simulation image;
a step of changing the three-dimensional model based on a model correction data that indicates a reflectance inputted based on the difference data;
a step of setting a plurality of radar parameters when the three-dimensional model is determined to be decided;
a step of calculating a plurality of simulation images respectively corresponding to the plurality of radar parameters; and
a step of outputting training data in that the plurality of simulation images and types of the target object are associated to each other,
wherein the training data are data for an image identification device, configured to identify a type of an object taken in an inputted image, to learn.

* * * * *